US009440182B2

(12) United States Patent
O'Brien et al.

(10) Patent No.: US 9,440,182 B2
(45) Date of Patent: Sep. 13, 2016

(54) LIQUID CARBON DIOXIDE ABSORBENTS, METHODS OF USING THE SAME, AND RELATED SYSTEMS

(75) Inventors: Michael Joseph O'Brien, Niskayuna, NY (US); Robert James Perry, Niskayuna, NY (US); Tunchiao Hubert Lam, Clifton Park, NY (US); Grigorii Lev Soloveichik, Latham, NY (US); Sergei Kniajanski, Clifton Park, NY (US); Larry Neil Lewis, Scotia, NY (US); Malgorzata Iwona Rubinsztajn, Ballston Spa, NY (US); Dan Hancu, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 521 days.

(21) Appl. No.: 13/332,843

(22) Filed: Dec. 21, 2011

(65) Prior Publication Data
US 2012/0171095 A1    Jul. 5, 2012

Related U.S. Application Data

(63) Continuation-in-part of application No. 12/512,577, filed on Jul. 30, 2009, now abandoned, and a continuation-in-part of application No. 13/343,905, filed on Dec. 24, 2008, now abandoned, and a continuation-in-part of application No. 12/512,105, filed on Jul. 30, 2009, now Pat. No. 8,030,509.

(51) Int. Cl.
C07F 7/08      (2006.01)
C07F 7/18      (2006.01)
C07C 215/06    (2006.01)
B01D 53/14     (2006.01)

(52) U.S. Cl.
CPC ....... *B01D 53/1475* (2013.01); *B01D 53/1493* (2013.01); *B01D 2252/20* (2013.01); *B01D 2252/202* (2013.01); *B01D 2252/205* (2013.01); *B01D 2252/2025* (2013.01); *B01D 2252/2028* (2013.01); *B01D 2252/2041* (2013.01); *B01D 2252/2056* (2013.01); *B01D 2252/20405* (2013.01); *B01D 2252/20415* (2013.01); *B01D 2252/20421* (2013.01); *B01D 2252/20426* (2013.01); *B01D 2252/20468* (2013.01); *B01D 2252/504* (2013.01); *B01D 2258/0283* (2013.01); *F23J 2215/50* (2013.01); *F23J 2219/40* (2013.01); *Y02C 10/04* (2013.01); *Y02C 10/06* (2013.01)

(58) Field of Classification Search
None
See application file for complete search history.

(56) References Cited

U.S. PATENT DOCUMENTS

| | | | |
|---|---|---|---|
| 3,215,648 A | 11/1965 | Duffy et al. | |
| 3,660,434 A | 5/1972 | Patterson | |
| 3,665,678 A | 5/1972 | Kammermeyer et al. | |
| 4,112,051 A | 9/1978 | Sartori et al. | |
| 4,405,582 A | 9/1983 | Stogryn et al. | |
| 4,843,127 A | 6/1989 | Akkapeddi et al. | |
| 5,087,597 A | 2/1992 | Leal et al. | |
| 5,921,911 A | 7/1999 | Hart | |
| 6,547,854 B1 | 4/2003 | Gray et al. | |
| 7,208,605 B2 | 4/2007 | Davis, Jr. | |
| 7,288,136 B1 | 10/2007 | Gray et al. | |
| 7,377,967 B2 | 5/2008 | Reddy et al. | |
| 7,419,646 B2 | 9/2008 | Cadours et al. | |
| 2004/0253159 A1 | 12/2004 | Hakka et al. | |
| 2006/0165574 A1 | 7/2006 | Sayari | |
| 2007/0149398 A1 | 6/2007 | Jones et al. | |
| 2008/0202341 A1 | 8/2008 | Poole et al. | |
| 2008/0226526 A1 | 9/2008 | Ronning et al. | |
| 2008/0282887 A1 | 11/2008 | Chance et al. | |
| 2010/0154639 A1 | 6/2010 | Perry et al. | |

FOREIGN PATENT DOCUMENTS

| | | | |
|---|---|---|---|
| CN | 1709553 A | 12/2005 | |
| CN | 101124031 A | 2/2008 | |
| CS | 92652 | 11/1959 | |
| DE | 102004053167 A1 | 5/2006 | |
| EP | 0674936 B1 * | 11/1998 | ............ B01D 53/14 |
| EP | 1656983 A1 | 5/2006 | |
| FR | 2923728 A1 | 5/2009 | |
| JP | 06172368 A | 6/1994 | |
| WO | 2006094411 A1 | 9/2006 | |
| WO | 2007074494 A1 | 7/2007 | |
| WO | 2008090168 A1 | 7/2008 | |
| WO | 2009029053 A1 | 3/2009 | |

OTHER PUBLICATIONS

"Perry's Chemical Engineers' Handbook." (c)1999 The McGraw-Hill Companies, Inc. (excerpt).*
U.S. Appl. No. 12/343,905, filed Dec. 24, 2008, Genovese et al.
U.S. Appl. No. 12/512,105, filed Jul. 30, 2009, Perry et al.

(Continued)

Primary Examiner — Daniel Berns
(74) Attorney, Agent, or Firm — Francis T. Coppa

(57) ABSTRACT

A carbon dioxide absorbent composition is described, including (i) a liquid, nonaqueous silicon-based material, functionalized with one or more groups that either reversibly react with $CO_2$ or have a high-affinity for $CO_2$; and (ii) a hydroxy-containing solvent that is capable of dissolving both the silicon-based material and a reaction product of the silicon-based material and $CO_2$. The absorbent may be utilized in methods to reduce carbon dioxide in an exhaust gas, and finds particular utility in power plants.

15 Claims, No Drawings

(56) References Cited

OTHER PUBLICATIONS

Plueddemann et al., "Epoxyorganosiloxanes", Journal of the American Chemical Society, vol. 81, pp. 2632-2635, 1959.
Bazant et al., "Organosilicon Compounds XVIII* Producdtion of Epoxyorganosilanes Through Oxidation of Akanyle Silanes With Perphthalic Acid", Collection of Czechoslovak Chemical communications, vol. 24, pp. 3758-3762, 1959.
Sakurai et al., "New Oxygen-Insertion Reaction into Silicon-Silicon Bonds with Tertiary Amine Oxides", Bulletin of the Chemical Society of Japan, vol. 44, Issue No. 4, pp. 1167, Apr. 1971.
Dixon et al., "Oxidation of Alkenyldisilanes by m-chloroperbenzoic acid", Journal of Organometallic Chemistry, vol. 231, Issue No. 4, pp. 299-305, 1982.
Voronkov et al., "Hydrosilylation of unsaturated amines with oligodimethylsiloxanes, containing terminal Si-bonds and some physico-chemical properties of the compounds obtained", Russian chemical industry, vol. 28, Issue No. 1, pp. 7-8, Dec. 31, 1996.
Soong et al., "Novel Amine Enriched Solid Sorbents for Carbon Dioxide Capture", First National Conference on Carbon Sequestration Washington DC, (United States), May 15-17, 2001.
Delaney et al., "Hybrid mesoporous materials for carbon dioxide separation", Fuel Chemistry Division Preprints, vol. 47, Issue No. 1, pp. 65-66, 2002.
Xu et al., "Novel Polyethylenimine-Modified Mesoporous Molecular Sieve of MCM-41 Type as High-Capacity Adsorbent for CO2 Capture", Energy & Fuels, vol. 16, Issue No. 6, pp. 1463-1469, 2002.
Bates et al., "CO2 Capture by a Task-Specific Ionic Liquid", JACS, J. Am. Chem. Soc., vol. 124, Issue No. 3, pp. 926-927, 2002.
Anthony et al., "Solubilities and Thermodynamic Properties of Gases in the Ionic Liquid 1-n-Butyl-3-methylimidazolium Hexafluorophosphate", J. Phys. Chem. B, vol. 106, Issue No. 29, pp. 7315-7320, 2002.
Chang et al., "In-situ infrared study of CO2 adsorption on SBA-15 grafted with y-(Aminopropyl) triethoxysilane", Energy & Fuels, vol. 17, Issue No. 2, pp. 468-473, 2003.
Husson-Borg et al., "Solubilities of Oxygen and Carbon Dioxide in Butyl Methyl Imidazolium Tetrafluoroborate as a Function of Temperature and at Pressures Close to Atmospheric Pressure", Journal of Chemical and Engineering Data, vol. 48, Issue No. 3, pp. 480-485, 2003.
Kamps et al., "Solubility of CO2 in the Ionic Liquid [bmim] [PF6]", Journal of Chemical and Engineering Data, vol. 48, Issue No. 3, pp. 746-749, 2003.
Tsai et al., "Novel amine-functional membrane for metabolic CO2 removal from spacesuit breathing loop", United Technologies Research Center, AIP Conference Proceedings, Space Technology and Applications International Forum—STAIF, East Hartford, CT, USA, vol. 654, pp. 861-868, 2003.
Baltus et al., "Low-Pressure Solubility of Carbon Dioxide in Room-Temperature Ionic Liquids Measured with a Quartz Crystal Microbalance", J. Phys. Chem. B, vol. 108, Issue No. 2, pp. 721-727, 2004.
Guliants et al., "Ordered Mesoporous and Macroporous Inorganic Films and Membranes", Journal of Membrane Science, vol. 235, pp. 53-72, 2004.
Gray et al., "CO2 capture by amine-enriched fly ash carbon sorbents", Separation and Purification Technology, vol. 35, pp. 31-36, 2004.
Camper et al., "Gas Solubilities in Room-Temperature Ionic Liquids", Ind. Eng. Chem. Res., vol. 43, Issue No. 12, pp. 3049-3054, 2004.
Cadena et al., "Why Is CO2 So Soluble in Imidazolium-Based Ionic Liquids?", JACS, J. Am. Chem. Soc., vol. 126, Issue No. 16, pp. 5300-5308, 2004.
Senthilkumar et al., "Structure-gas separation property relationships of non-ionic and cationic amino-hydroxy functionalized poly (dimethylsiloxane) membranes", Journal of Membrane Science, vol. 232, pp. 73-83, 2004.
Gray et al., "Capture of carbon dioxide by solid amine sorbents", International Journal of Environmental Technology and Management, vol. 4, Issue No. 1/2, pp. 82-88, 2004.
Hiyoshi et al., "Reversible adsorption of carbon dioxide on amine-modified SBA-15 from flue gas containing water vapor", Studies in Surface Science and Catalysis, vol. 153, pp. 417-422, 2004.
Hiyoshi et al., "Adsorption of carbon dioxide on modified mesoporous materials in the presence of water vapor", Studies in Surface Science and Catalysis, vol. 154, pp. 2995-3002, 2004.
Knowles et al., "Amine-functionalised mesoporous silicas as CO2 adsorbents", Studies in Surface Science and catalysis, vol. 156, pp. 887-896, 2005.
Senthilkumar et al., "Gas permeation and sorption properties of non-ionic and cationic amino-hydroxy functionalized poly (dimethylsiloxane) membranes", Journal of Membrane Science, vol. 254, pp. 169-177, 2005.
Arenillas et al., "CO2 capture using some fly ash-derived carbon materials", Fuel, vol. 84, pp. 2204-2210, 2005.
Anthony et al., "Anion Effects on Gas Solubility in Ionic Liquids", J. Phys. Chem. B, vol. 109, Issue No. 13, pp. 6366-6374, 2005.
Alauzun et al., "CO2 as a Supramolecular Assembly Agent: A Route for Lamellar Materials with a High Content of Amine Groups", Journal of the American Chemical Society, vol. 127, Issue No. 32, pp. 11204-11205, 2005.
Hiyoshi et al., "Adsorption characteristics of carbon dioxide on organically functionalized SBA-15", Microporous and Mesoporous Materials, vol. 84, pp. 357-365, 2005.
Shiflett et al., "Solubilities and Diffusivities of Carbon Dioxide in Ionic Liquids: [bmim] [PF6] and [bmim] [BF4]", Industrial Engineering Chemical Res., vol. 44, Issue No. 12, pp. 4453-4464, 2005.
Yu et al., "Design of Task-Specific Ionic Liquids for Capturing CO2: A Molecular Orbital Study", Ind. Eng. Chem. Res., vol. 45, pp. 2875-2880, Issue No. 8, 2006.
Mandal et al., "Absorption of carbon dioxide into aqueous blends of 2-amino-2-methyl-1-propanol and monoethanolamine", Chemical Engineering Science, vol. 61, pp. 5440-5447, 2006.
Khatri et al., "Thermal and Chemical Stability of Regenerable Solid Amine Sorbent for CO2 Capture", Energy & Fuels, vol. 20, Issue No. 4, pp. 1514-1520, 2006.
ChemGroup.com, "Triethylene Glycol—Vapor Pressure Data", Visited Mar. 24, 2011 at www.chem-group.com/services/tegvapor.tpl, 2006.
Internet Archive history page for www.chem-group.com/services/teg-vapor.tpl, visited Mar. 24, 2011 at http://waybackmachine.org/20060601000000*/http://www.chem-group.com/services/teg-vapor.tpl, 2006.
Soutullo et al., "Reversible CO2 Capture by Unexpected Plastic-, Resin-, and Gel-like Ionic Soft Materials Discovered during the Combi-Click Generation of a TSIL Library", Chemistry of Materials, vol. 19, Issue No. 15, pp. 3581-3583, Jul. 24, 2007.
Linfang et al., "CO2 adsorption on SBA-15 modified by aminosilane", Chinese Journal of Catalysis, vol. 28, Issue No. 9, pp. 805-810, Sep. 2007.
Mengxue et al., "Synthesis and characterization of a novel siloxane-containing liquid epoxy resin", New Chemical Materials, vol. 35, Issue No. 12, pp. 20-21, Dec. 15, 2007.
Andreu et al., "Capturing the Solubility Behavior of CO2 in Ionic Liquids by a Simple Model", J. Phys. Chem. C, vol. 111, Issue No. 43, pp. 16028-16034, 2007.
Plaza et al., "CO2 capture by adsorption with nitrogen enriched carbons", Fuel, vol. 86, pp. 2204-2212, 2007.
Harlick et al, "Applications of pore-expanded mesoporous silica. 5. triamine grafted material with exceptional CO dynamic and equilibrium adsorption performance", Industrial & Engineering Chemistry Research, vol. 46, Issue No. 2, pp. 446-458, 2007.
Knofel et al., "Functionalised Micro-/mesoporous silica for the adsorption of carbon dioxide", Microporous and Mesoporous Materials, vol. 99, pp. 79-85, 2007.
Liu et al., "Adsorption and regeneration study of the mesoporous adsorbent SBA-15 adapted to the capture/separation of CO2 and CH4", Chemical Engineering Science, vol. 62, pp. 1101-1110, 2007.

(56) References Cited

OTHER PUBLICATIONS

Schladt et al., "Supported Amine Sorbents under Temperature Swing Absorption for CO2 and Moisture Capture", Ind. Eng. Chem. Res., vol. 46, Issue No. 5, pp. 1590-1597, 2007.
Favre, "Carbon dioxide recovery from post-combustion processes: Can gas permeation membranes compete with absorption?", Journal of Membrane Science, vol. 294, pp. 50-59, 2007.
Banerjee et al., "High-Throughput Synthesis of Zeolitic Imidazolate Frameworks and Application to CO2 Capture", Science, vol. 319, pp. 939-943, Feb. 15, 2008.
"Annual Energy Outlook 2008 with Projections to 2030", Energy Information Administration, pp. 1-224, Jun. 2008.
Scholes et al., "Carbon Dioxide Separation through Polymeric Membrane Systems for Flue Gas Applications", Recent Patents on Chemical Engineering, vol. 1, Issue No. 1, pp. 52-66, 2008.
Kim et al., "CO2 adsorption using amine-functionalized mesoporous silica prepared via anionic surfactant-mediated synthesis", Microporous and Mesoporous Materials, vol. 115, Issue No. 3, pp. 497-503, 2008.
Zelenak et al., "Amine-modified ordered mesoporous silica: Effect of pore size on carbon dioxide capture", Chemical Engineering Journal, vol. 144, pp. 336-342, 2008.
Yang et al., "Progress in Carbon Dioxide Separation and Capture: A Review", Journal of Environmental Sciences, vol. 20, pp. 14-27, 2008.
Merel et al., "Experimental Investigation on CO2 Post-Combustion Capture by Indirect Thermal Swing Adsorption Using 13X and 5A Zeolites", Ind. Eng. Chem. Res., vol. 47, Issue No. 1, pp. 209-215, 2008.
"Novel High Capacity Oligomers for Low Cost CO2 Capture", Annual NETL CO2 Capture Technology for Existing Plants R&D Meeting, pp. 1-32, Mar. 24-26, 2009.
Chatti et al., "Amine loaded zeolites for carbon dioxide capture: Amine loading and adsorption studies", Microporous and Mesoporous Materials, vol. 121, pp. 84-89, May 2009.
International Search Report and Written Opinion issued in connection with related PCT Application No. PCT/US2010/030744 dated Jul. 14, 2010.
Non-Final Rejection towards related U.S. Appl. No. 12/343,905 dated Oct. 18, 2010.
International Search Report and Written Opinion issued in connection with related PCT Application No. PCT/US2010/029620 dated Oct. 26, 2010.
Final Rejection towards related U.S. Appl. No. 12/343,905 dated Mar. 21, 2011.
Non-Final Rejection towards corresponding U.S. Appl. No. 12/512,577 dated Mar. 31, 2011.
Notice of Allowance issued in connection with related U.S. Appl. No. 12/512,105 dated Jun. 2, 2011.
Final Rejection towards corresponding U.S. Appl. No. 12/512,577 dated Oct. 17, 2011.
European Search Report and Written Opinion issued in connection with related EP Application No. 09179163.2-1213 dated Mar. 22, 2012.
Office Action issued in connection with related CN Application No. 2010800450253 on Dec. 24, 2012.
Office Action issued in connection with related CN Application No. 200910266381.7 on May 28, 2013.
Office Action issued in connection with related EP Application No. 091791632-1351 on Jul. 11, 2013.
Unofficial English translation of Office Action issued in connection with related JP Application No. 2012-522824 on Jul. 15, 2014.
Unofficial English translation of Notice of Allowance issued in connection with corresponding JP Application No. 2012-522824 on Jun. 9, 2015.
Office Action issued in connection with related AU Application No. 2010276766 on Aug. 13, 2015.
Office Action issued in connection with corresponding AU Application No. 2010276681 on Nov. 23, 2015.

\* cited by examiner

LIQUID CARBON DIOXIDE ABSORBENTS, METHODS OF USING THE SAME, AND RELATED SYSTEMS

CROSS REFERENCE TO RELATED APPLICATIONS

The present application is a continuation-in-part of U.S. patent application Ser. No. 12/512,577, filed on Jul. 30, 2009, which is a continuation-in-part of application Ser. No. 12/343,905, filed on Dec. 24, 2008. The present application is also related to U.S. patent application Ser. No. 12/512,105, filed on Jul. 30, 2009; and now issued as U.S. Pat. No. 8,030,509. The contents of the two Applications and the issued patent are incorporated herein by reference, to the extent they are consistent with the definitions utilized herein.

STATEMENT REGARDING FEDERALLY SPONSORED RESEARCH & DEVELOPMENT

This invention was made with Government support under grant number DE-NT0005310 awarded by the Department of Energy-NETL. The Government has certain rights in the invention.

BACKGROUND

Pulverized coal (PC) power plants currently produce over half the electricity used in the United States. In 2007, these plants emitted over 1900 million metric tons of carbon dioxide ($CO_2$), and as such, accounted for 83% of the total $CO_2$ emissions from electric power generating plants and 33% of the total US $CO_2$ emissions. Eliminating, or even reducing, these emissions will be essential in any plan to reduce greenhouse gas emissions.

Separating $CO_2$ from gas streams has been commercialized for decades in food production, natural gas sweetening, and other processes. Aqueous monoethanolamine (MEA) based solvent capture is currently considered to be the best commercially available technology to separate $CO_2$ from exhaust gases, and is the benchmark against which future developments in this area will be evaluated. Unfortunately, such amine-based systems were not designed for processing the large volumes of flue gas produced by a PC plant. Scaling the MEA-based $CO_2$ capture system to the size required for PC plants would result in an 83% increase in the overall cost of electricity for the PC plant. Applying this technology to all existing PC plants in the US would cost $125 billion per year, making MEA-based $CO_2$ capture an unlikely choice for large-scale commercialization.

There are many properties that desirably would be exhibited, or enhanced, in any $CO_2$ capture technology contemplated to be a feasible alternative to the currently utilized MEA-based systems. For example, any such technology would desirably exhibit a high net $CO_2$ capacity, and could provide lower capital and operating costs (less material volume required to heat and cool, therefore less energy required). A lower heat of reaction would mean that less energy would be required to release the $CO_2$ from the material. Desirably, the technology would not require a pre-capture gas compression so that a high net $CO_2$ capacity could be achieved at low $CO_2$ partial pressures, lowering the energy required for capture.

Moreover, $CO_2$ capture technologies utilizing materials with lower viscosities would provide improved mass transfer, reducing the size of equipment needed, as well as a reduction in the cost of energy to run it. Low volatility and high thermal, chemical and hydrolytic stability of the material(s) employed could reduce the amount of material needing to be replenished, and could reduce the emission of degradation products. Of course, any such technology would also desirably have low material costs so that material make-up costs for the system would be minimized. Operability of $CO_2$ release at high pressures could reduce the energy required for $CO_2$ compression prior to sequestration. These technologies would also desirably exhibit reduced corrosivity to help reduce capital and maintenance costs, and further would not require significant cooling to achieve the desired net $CO_2$ loading, reducing operating costs.

In some cases, it would be very desirable if the new $CO_2$ capture technology could maintain reaction materials and reaction products in a liquid state on a relatively consistent basis. This would also allow better handling and transport of the materials through the $CO_2$ capture systems, and could also contribute to lower operating costs.

Unfortunately, many of the above delineated desired properties interact and/or depend on one another, so that they cannot be varied independently; and trade-offs are required. For example, in order to have low volatility, the materials used in any such technology typically must have a fairly large molecular weight; but to have low viscosity, the materials must have a low molecular weight. To have a high $CO_2$ capacity at low pressures, the overall heat of reaction needs to be high; but to have low regeneration energy, the overall heat of reaction needs to be low. Moreover, as of this time, it has been very difficult (if not impossible) to find $CO_2$ capture materials that have relatively high $CO_2$ absorbance capabilities, but that can also remain in a liquid state throughout the capture process.

Desirably, a $CO_2$ capture technology would be provided that optimizes as many of the above desired properties as possible, yet without causing substantial detriment to other desired properties. At a minimum, in order to be commercially viable, such technology would desirably be low cost; and would utilize materials(s) having low volatility and high thermal stability. The materials should also have a high net capacity for $CO_2$; and the capacity to remain in the liquid state during the $CO_2$ capture process.

BRIEF DESCRIPTION

In a first aspect, there is provided a carbon dioxide absorbent comprising (i) a liquid, nonaqueous silicon-based material, functionalized with one or more groups that reversibly react with $CO_2$ and/or have a high-affinity for $CO_2$; and (ii) a hydroxy-containing solvent that is capable of dissolving both the silicon-based material and a reaction product of the silicon-based material and carbon dioxide Also, a second aspect provides a method for reducing the amount of carbon dioxide in a process stream comprising contacting the stream with a carbon dioxide absorbent comprising (i) a liquid, nonaqueous, silicon-based material, functionalized with one or more groups that reversibly react with $CO_2$ and/or have a high-affinity for $CO_2$; and (ii) a hydroxy-containing solvent, as mentioned above and further described below.

In a third aspect, a power plant is provided, comprising a carbon dioxide removal unit, and further comprising a carbon dioxide absorbent, as described herein.

A method of generating electricity with reduced carbon dioxide emissions is also provided. The method comprises combusting a fuel (pulverized coal, liquid hydrocarbon, natural gas and the like), and directing the flue gas comprising carbon dioxide to an electricity-generating system, e.g. a steam or gas turbine, and then to a carbon dioxide removal unit comprising a carbon dioxide absorbent, as described herein.

DETAILED DESCRIPTION

Unless defined otherwise, technical and scientific terms used herein have the same meaning as is commonly understood by one of skill in the art to which this invention belongs. The terms "first", "second", and the like, as used herein, do not denote any order, quantity, or importance, but rather are used to distinguish one element from another. Also, the terms "a" and "an" do not denote a limitation of quantity, but rather denote the presence of at least one of the referenced items, and the terms "front", "back", "bottom", and/or "top", unless otherwise noted, are merely used for convenience of description, and are not limited to any one position or spatial orientation.

If ranges are disclosed, the endpoints of all ranges directed to the same component or property are inclusive and independently combinable (e.g., ranges of "up to about 25 wt. %", or, more specifically, "about 5 wt. % to about 20 wt. %", is inclusive of the endpoints and all intermediate values of the ranges of "about 5 wt. % to about 25 wt. %," etc.). The modifier "about" used in connection with a quantity is inclusive of the stated value, and has the meaning dictated by the context (e.g., it includes the degree of error associated with measurement of the particular quantity).

The subject matter disclosed herein relates generally to carbon dioxide absorbents, power plants incorporating them, and methods of using the absorbents to absorb carbon dioxide from process streams, e.g., as may be produced by methods of generating electricity. Conventional carbon dioxide absorbents lack one or more of the properties considered important, if not critical, in the commercial feasibility of their use in many technologies. MEA-based aqueous absorbents, for example, were not designed for use with large volumes of exhaust gas. As a result, use of these absorbents in such processes is extremely energy-intensive and costly—too costly for implementation into power plants for post combustion $CO_2$ capture. Moreover, the use of $CO_2$ absorbents and related reaction products that cannot remain in the liquid state throughout the $CO_2$ capture process would represent another problem for commercial feasibility, as described herein.

Embodiments of the present invention are directed to carbon dioxide absorbents comprising liquid, nonaqueous silicon-based materials, and a hydroxy-containing solvent. Silicon-based materials are defined as molecules having between one and twenty repeat units, and thus, may include small molecules comprising silicon, i.e., molecules comprising from one to five silicon atoms, or oligomeric materials comprising between about 5 and 20 silicon atoms.

In one embodiment, the present absorbent comprises a $CO_2$-philic, silicon-containing oligomer, e.g., comprising less than about 20 repeating, monomeric units, and desirably from about 5 to about 10 repeating monomeric units. As used herein, the term "$CO_2$-philic silicon containing oligomer" means an oligomer that has an affinity for $CO_2$, as may be evidenced by solubility in liquid or supercritical $CO_2$, or an ability to physically absorb $CO_2$ In some particular embodiments, the silicone materials are well-suited for use in the present absorbents. Also correctly referred to as polymerized siloxanes or polysiloxanes, silicones are mixed inorganic-organic polymers or oligomers with the chemical formula $[R_2SiO]_n$, wherein R comprises a linear, branched or aromatic organic group of any number of carbons, e.g., methyl ethyl, phenyl, etc. These materials thus comprise an inorganic silicon-oxygen backbone ( ... Si—O—Si—O—Si—O— ... ) with organic side groups attached to the silicon atoms, which are four-coordinate. These silicones may be linear, with R and OR' end-capping groups; or may be cyclic in structure, containing only the repeating units. An example of the latter is octamethylcyclotetrasiloxane. Branched silicones can also be used.

Silicones have low volatility, even at short chain lengths, and in the liquid state at room temperature. They are typically low cost, and stable at high temperatures, e.g., up to about 150° C. Silicones are also readily functionalized, and so, can be functionalized with groups that increase their affinity for $CO_2$.

The length of the silicone oligomer chain can be easily controlled during synthesis, thereby allowing control of such physical properties as viscosity and boiling point. In addition, siloxane bonds are thermally stable and hydrolytically stable in the absence of strong acids or bases. Many silicone precursors are commercially available, and so advantageously, large scale production capabilities would not have to be developed. Many of these may be utilized in the present invention. One example of a silicone suitable for functionalization in the present invention, and available from a variety of sources, comprises polyhydridomethylsiloxane.

In another embodiment, the present absorbent comprises a $CO_2$-philic, silicon-based small molecule, e.g., comprising from about one to about five silicon atoms. As used herein, the term "$CO_2$-philic silicon-based small molecule" means a material that reversibly reacts with or has an affinity for $CO_2$.

The silicon-based small molecules may comprise one silicon atom as shown in Formula (I), wherein L=a linking group of $C_1$-$C_{18}$, and may be aliphatic, aromatic, heteroaliphatic, heteroaromatic or mixtures thereof:

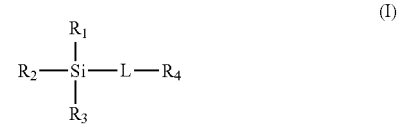

(I)

In formula (I), $R_1$, $R_2$, $R_3$ may be the same or different, and may be $C_1$-$C_{18}$ aliphatic, aromatic, heteroaliphatic, heteroaromatic or mixtures thereof; and $R_4$=$NR_5R_6$ where at least one of $R_5$ or $R_6$ is H. The other may be $C_1$-$C_{18}$ aliphatic, aromatic, heteroaliphatic, heteroaromatic or mixtures thereof.

In some embodiments, the silicon-based materials may be as shown in Formulas II-VI. When x≤5, y+z≤5 and/or r≤5, these materials would generally be considered to be silicon-based small molecules. Alternatively, when x≥5, y+z≥5 and/or r≥5, these silicon based materials would generally be considered to be silicon-containing oligomers. As depicted in structures II-VI, the core of the silicon-based small molecule may be linear, cyclic, branched, or combinations of these configurations. In most embodiments related to these formulae, "x" and "y+z" each have a value no greater than about 20; while the "r" value is usually no greater than about 10.

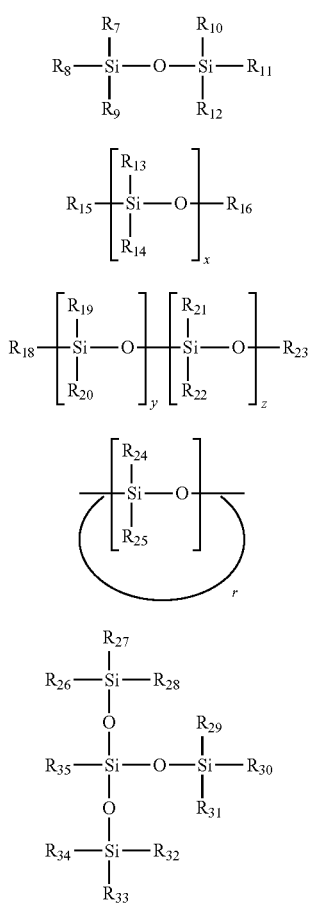

For Formula II, $R_7$-$R_{12}$ may be the same or different. At least one of $R_7$-$R_{12}$ will desirably be L-$R_4$, while the remainder are desirably $C_1$-$C_{18}$ aliphatic, aromatic, heteroaliphatic, heteroaromatic, or mixtures thereof.

For formula III, $R_{13}$-$R_{16}$ may be the same or different. At least one of $R_{13}$-$R_{16}$ will desirably be L-$R_4$, while the remainder are desirably $C_1$-$C_{18}$ aliphatic, aromatic, heteroaliphatic, heteroaromatic or mixtures thereof. $R_{16}$ is SiRR'R", wherein R, R' and R" may be the same or different, and may be $C_1$-$C_{18}$ aliphatic, aromatic, heteroaliphatic, heteroaromatic or mixtures thereof, and may be L-$R_4$.

For formulae IV, V, and VI, $R_{18}$-$R_{23}$ and $R_{24}$-$R_{25}$ and $R_{26}$-$R_{35}$ may be the same or different; and at least one of $R_{18}$-$R_{23}$=L-$R_4$; at least one of $R_{24}$-$R_{25}$=L-$R_4$; and at least one of $R_{26}$-$R_{35}$=L-$R_4$; and the rest may be $C_1$-$C_{18}$ aliphatic, aromatic, heteroaliphatic, heteroaromatic, or mixtures thereof. A related proviso is that $R_{23}$ is SiRR'R", wherein R, R' and R" may be the same or different, and may be $C_1$-$C_{18}$ aliphatic, aromatic, heteroaliphatic, heteroaromatic or mixtures thereof, and may be L-$R_4$.

The silicon-based material may desirably be functionalized with groups that enhance its net capacity for $CO_2$. Functional groups that are expected to be $CO_2$-philic, and react with $CO_2$ in a silicon-based material they functionalize, include any of those including nitrogen, such as, for example aliphatic amines, imines, amidines, amides, heterocyclic amino compounds such as pyridine, aromatic amines such as aniline, and the like, as well as combinations of any of these. The particular functional group utilized will depend upon the silicon-based material chosen. For those embodiments wherein the silicon-based material comprises a siloxane, amine functionality may be suitable, since many aminosiloxanes are readily commercially available, and are readily further functionalized if desired or required, in order to increase $CO_2$ reactivity. Non-limiting examples of amine functional groups that exhibit $CO_2$-reactivity include aminomethyl, aminoethyl, aminopropyl, aminoethyl-aminopropyl, aminoethyl-aminoisobutyl, aminoethylaminomethyl, 2-aminopyridyl, 2-aminopropylpyridyl, piperazine-propyl and imidazoyl propyl.

Functional groups may be located in a side chain, and can also be the end-capping groups. Aminoethyl-aminopropyl siloxane oligomers with functional groups in the side chain are exemplified by the molecule shown below at Figure VII. This material has a maximum theoretical $CO_2$ capacity of about 20 wt %, compared to 10 wt % for 30 wt % aqueous MEA.

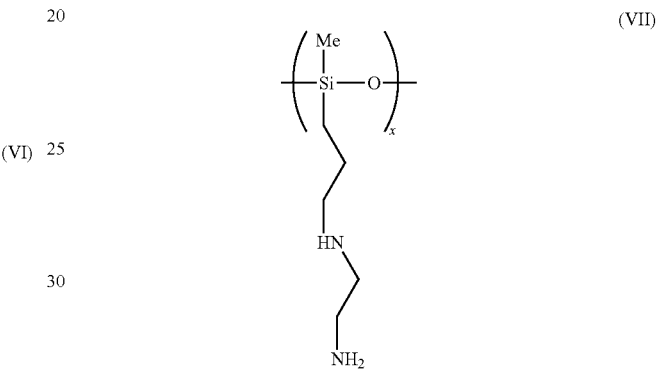

One other example of an amino siloxane with end-capped functional groups suitable for use in the present absorbent is aminopropyl terminated polydimethyldisiloxane, shown below in Figure VIII:

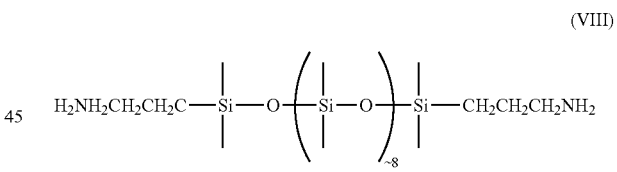

One such aminosiloxane is used for hair conditioning, and is commercially available from Gelest, with a number average molecular weight of from about 850 to about 900, and a calculated $CO_2$ absorption capacity of from about 4.4 to about 5.2%. It is expected that the addition of further amine functionality will result in an increase in this absorption capacity.

Those of ordinary skill in the art of polymer chemistry are well versed in methods of adding functional groups to the backbone of an oligomer useful in the present absorbent. Numerous methods of attachment of functional groups are known such as hydrosilylation and displacement as shown in Michael A. Brook's book *Silicon in Organic, Organometallic, and Polymer Chemistry* (Wiley VCH Press, 2000).

As alluded to previously, in many cases, silicon-based functionalized materials form solids or very high viscosity oils on reaction with $CO_2$. This can negatively impact mass transfer, so that the absorbent material does not react with as much $CO_2$ as is theoretically possible. Furthermore, materials that form solid $CO_2$ reaction products would not readily fit into existing $CO_2$ capture process schemes. Therefore, a selected co-solvent is added according to embodiments of this invention. The co-solvent is hydroxy-containing, as explained below, and maintains liquidity on reaction with $CO_2$, thereby maximizing capture efficiency, and enhancing the compatibility of the selected materials with standard $CO_2$ capture systems.

The concept of using co-solvents in conjunction with aminoalkanols to absorb $CO_2$ from mixed gas streams was generally known in the art. Reference is made, for example, to U.S. Pat. No. 4,112,051, issued to Sartori et al. However, the success of this approach with materials that are much less polar (like many of the silicon-based materials of the present invention) might appear doubtful to those skilled in the art. In order to fulfill its function of maintaining solution liquidity, the co-solvent must be very miscible with both the silicon-based material and its $CO_2$ reaction product. In view of the difference in polarity between typical siloxane materials and hydroxy-containing solvents, identification of suitable solvents was a very difficult task.

Surprisingly, the present inventors identified certain hydroxy-containing solvents that are able to solubilize both the silicon-based materials described above, and their $CO_2$ reaction products. As used herein, the phrase "hydroxy-containing solvent" means a solvent that has one or more hydroxy groups. The hydroxy-containing solvent also desirably has a low vapor pressure, e.g., below about 150 mm Hg at 100° C.; and often, from about 0.001 to about 30 mm Hg at 100° C., so that minimal loss of the hydroxy-containing solvent occurs via evaporation.

Suitable hydroxy-containing solvents for embodiments of this invention are liquid at room temperature, and are capable of dissolving the silicon-based material and its $CO_2$ reaction product. In preferred embodiments, the solvents are capable of dissolving the constituents at relatively high concentrations, e.g., at least about 20% of the silicon-based material, and in some preferred embodiments, at least about 40% of the silicon-based materials. In this manner, a stable solution of the silicon-based material and a carbamic-acid salt (one of the typical reaction products) are present as a stable solution.

In preferred embodiments, the hydroxy-containing solvents do not, themselves, substantially chemically react with $CO_2$. Rather, they serve as a medium for $CO_2$ transfer to the functionalized silicon-based material. As a result, the hydroxy-containing solvents are expected to be capable of increasing the reaction rate, e.g., by increasing the mass transfer rate, of $CO_2$ and the silicon-based material, and also to reduce, or substantially prevent, excessive viscosity build-up when the silicon-based material reacts with $CO_2$. Advantageously, many suitable hydroxyl-containing solvents may be recycled, along with the silicon-based material, if desired.

Examples of suitable hydroxy-containing solvents include, but are not limited to, those comprising one or more hydroxyl groups, such as, glycols, phenols, and hydroxylated silicones. Suitable glycols may include, for example, trimethylolpropane ethoxylates, glycerol, ethylene glycol, diethylene glycol, triethylene glycol and tetraethylene glycol, to name a few. Suitable hydroxylated silicones include, for example, 1,3-bis(3-hydroxypropyl)tetramethyldisiloxane, or the hydro silylation reaction product of 1,1,3,3-tetramethyldisiloxane and trimethylolpropane allylether. Hydroxy compounds may also be in the form of phenols such as eugenol, isoeugenol, 2-allyl-6-methylphenol, 2-allylphenol and the like.

In certain embodiments, the absorbent may comprise an amount of water, e.g., so that all water need not be removed from the process stream in order to utilize the absorbent and methods. Indeed, in some embodiments, water is desirably present and in such embodiments, can assist in the solubilization of reaction products.

Optionally, the absorbent may also include other components, such as, e.g., oxidation inhibitors to increase the oxidative stability and anti-foaming agents. The use of oxidation inhibitors, also called antioxidants, can be especially advantageous in those embodiments of the invention wherein the functional groups comprise amine groups.

The carbon dioxide absorbents provided herein are expected to provide substantial improvement when utilized to remove $CO_2$ from process gases, as compared to those currently commercially available and/or utilized for this purpose. As such, a method of reducing the carbon dioxide in a process stream is provided, and comprises contacting the process stream with the carbon dioxide absorbents described herein. The process stream so treated may be any wherein the level of $CO_2$ therein is desirably reduced, and in many processes, $CO_2$ is desirably reduced at least in the exhaust streams produced thereby. The process stream is typically gaseous, but may contain solid or liquid particulates, and may be at a wide range of temperatures and pressures, depending on the application.

The carbon dioxide absorbents for embodiments of this invention have low volatility, high thermal stability, and are either commercially available with, or can be provided with, a high net capacity for $CO_2$, and as such, are appropriate for large scale implementation. And so, there is also provided a power plant utilizing the present absorbents, and a method of utilizing the absorbents in generating electricity with reduced carbon dioxide emissions.

Examples 1-12

Reaction of silicon-based materials with $CO_2$ in the presence of a hydroxy-containing co-solvent.

To illustrate the ability of the hydroxy-containing co-solvent triethylene glycol to enhance the $CO_2$ absorption of various silicon-based materials, as well as providing a liquid medium, the following Examples 1-12 were conducted. The silicon-based materials were exposed to 1 atmosphere of $CO_2$ in the presence of, or not in the presence of, the hydroxyl-containing co-solvent triethylene glycol (at 50 wt %, with the exception of example 4 at 75 wt %) at 40° C. for 2 hours (h) with mechanical stirring.

Comparative Example 1

Into a pre-tared, 25 mL, three-neck, round-bottom flask equipped with a mechanical stirrer, gas inlet and a gas outlet and heated with a temperature controlled oil bath, was charged 2.0707 g of 1,3-Bis(3-aminopropyl)tetramethyldisiloxane. Dry $CO_2$ gas was introduced at a rate of ~50 mL/min into the flask via a glass tube positioned ~10 mm above the stirring liquid surface. $CO_2$ exposure continued for 2 h at 40° C. after which time the exterior of the flask was cleaned and the flask weighed. The total weight gain of 0.3588 g corresponded to 71% of the theoretical amount of weight that should have been gained if all the amine groups had reacted with a stoichiometric amount of $CO_2$. The reaction product was also a solid.

Example 2

2.0194 g of 1,3-Bis(3-aminopropyl)tetramethyldisiloxane and 2.0174 g of triethylene glycol were charged into a flask and allowed to react with $CO_2$ according to the procedure described in Example 1. The total weight gain was 0.4089 g. This corresponded to 114% of the theoretical amount of weight that should have been gained if all the amine groups had reacted with a stoichiometric amount of $CO_2$. In contrast to Example 1, the reaction product here was a liquid.

Comparative Example 3

2.0653 g of aminoethylaminopropyl methylsiloxane oligomer were charged into a flask and allowed to react with $CO_2$ according to the procedure described in Example 1. The total weight gain was 0.2110 g. This corresponded to 37% of the theoretical amount of weight that should have been gained if all the amine groups had reacted with a stoichiometric amount of $CO_2$. The reaction product was a solid.

Example 4

2.0168 g of aminoethylaminopropyl methylsiloxane oligomer and 4.0292 g of triethylene glycol were charged into a flask and allowed to react with $CO_2$ according to the procedure described in Example 1. The total weight gain was 0.4803 g. This corresponded to 87% of the theoretical amount of weight that should have been gained if all the amine groups had reacted with a stoichiometric amount of $CO_2$. The reaction product was a liquid, in contrast to comparative Example 3, which did not include triethyleneglycol.

Comparative Example 5

2.0295 g of 1,3-Bis(3-aminoethylaminopropyl)-tetramethyldisiloxane were charged into a flask and allowed to react with $CO_2$ according to the procedure described in Example 1. The total weight gain was 0.3389 g. This corresponded to 64% of the theoretical amount of weight that should have been gained if all the amine groups had reacted with a stoichiometric amount of $CO_2$. The reaction product was a solid.

Example 6

2.0240 g of 1,3-Bis(3-aminoethylaminopropyl)-tetramethyldisiloxane and 2.0237 g of triethylene glycol were charged into a flask and allowed to react with $CO_2$ according to the procedure described in Example 1. The total weight gain was 0.4777 g. This corresponded to 90% of the theoretical amount of weight that should have been gained if all of the amine groups had reacted with a stoichiometric amount of $CO_2$. The reaction product was a liquid, in contrast to the solid obtained in example 5.

Comparative Example 7

1.1090 g of 1,3,5,7-tetrakis(3-aminopropyl)-tetramethyl-cyclotetrasiloxane were charged into a flask and allowed to react with $CO_2$ according to the procedure described in Example 1. The total weight gain was 0.0621. This corresponded to 30% of the theoretical amount of weight that should have been gained if all the amine groups had reacted with a stoichiometric amount of $CO_2$. The reaction product was a solid.

Example 8

1.0722 g of 1,3,5,7-tetrakis(3-aminopropyl)-tetramethyl-cyclotetrasiloxane and 1.1028 g of triethylene glycol were charged into a flask and allowed to react with $CO_2$ according to the procedure described in Example 1 The total weight gain was 0.3099 g. This corresponded to 154% of the theoretical amount of weight that should have been gained if all the amine groups had reacted with a stoichiometric amount of $CO_2$. The reaction product was a liquid, in contrast to the solid product obtained in example 7.

Comparative Example 9

1.0498 g of Tetrakis(3-aminopropyl-dimethylsiloxy)silane were charged into a flask and allowed to react with $CO_2$ according to the procedure described in Example 1. The total weight gain was 0.1445 g. This corresponded to 87% of the theoretical amount of weight that should have been gained if all the amine groups had reacted with a stoichiometric amount of $CO_2$. The reaction product was a solid.

Example 10

1.0662 g of Tetrakis(3-aminopropyldimethylsiloxy)silane and 0.1.1175 g of triethylene glycol were charged into a flask and allowed to react with $CO_2$ according to the procedure described in Example 1. The total weight gain was 0.1956 g. This corresponded to 116% of the theoretical amount of weight that should have been gained if all the amine groups had reacted with a stoichiometric amount of $CO_2$. The reaction product was a liquid, in contrast to the solid obtained in example 9.

Comparative Example 11

1.2135 g of 1,3-Bis(3,9-dimethyl-5,8,11-trioxa-2-azatetradecan-13-amine) were charged into a flask and allowed to react with $CO_2$ according to the procedure described in Example 1. The total weight gain was 0.0742 g. This corresponded to 44% of the theoretical amount of weight that should have been gained if all the amine groups had reacted with a stoichiometric amount of $CO_2$. The reaction product was a solid.

Example 12

1.0323 g of 1,3-Bis(3,9-dimethyl-5,8,11-trioxa-2-azatetradecan-13-amine) and 1.0368 g of triethylene glycol were charged into a flask and allowed to react with $CO_2$ according to the procedure described in Example 1. The total weight gain was 0.0587 g. This corresponded to 41% of the theoretical amount of weight that should have been gained if all the amine groups had reacted with a stoichiometric amount of $CO_2$. The reaction product was a liquid, in contrast to the solid obtained in example 11.

The results of Examples 1-12 are summarized in Table 1, below.

TABLE 1

| Example | Amine | Co-solvent present | % of Theoretical wt gain | Physical state of product |
| --- | --- | --- | --- | --- |
| 1 comparative | 1,3-Bis(3-aminopropyl)tetramethyldisiloxane | No | 71 | S |
| 2 | 1,3-Bis(3-aminopropyl)tetramethyldisiloxane | Yes | 114 | L |

TABLE 1-continued

| Example | Amine | Co-solvent present | % of Theoretical wt gain | Physical state of product |
|---|---|---|---|---|
| 3 comparative | Aminoethylaminopropyl methylsiloxane oligomer | No | 37 | S |
| 4 | Aminoethylaminopropyl methylsiloxane oligomer | Yes | 87 | L |
| 5 comparative | 1,3-Bis(3-aminoethylaminopropyl)tetramethyldisiloxane | No | 64 | S |
| 6 | 1,3-Bis(3-aminoethylaminopropyl)tetramethyldisiloxane | Yes | 90 | L |
| 7 comparative | 1,3,5,7-tetrakis(3-aminopropyl)tetramethylcyclotetrasiloxane | No | 30 | S |
| 8 | 1,3,5,7-tetrakis(3-aminopropyl)tetramethylcyclotetrasiloxane | Yes | 154 | L |
| 9 comparative | Tetrakis(3-aminopropyldimethylsiloxy)silane | No | 87 | S |
| 10 | Tetrakis(3-aminopropyldimethylsiloxy)silane | Yes | 116 | L |
| 11 comparative | 1,3-Bis(3,9-dimethyl-5,8,11-trioxa-2-azatetradecan-13-amine) | No | 44 | S |
| 12 | 1,3-Bis(3,9-dimethyl-5,8,11-trioxa-2-azatetradecan-13-amine) | Yes | 41 | L |

Examples 13-20

Reaction of a silicon-based material with $CO_2$ in the presence of various hydroxy-containing co-solvents.

To illustrate the ability of the hydroxy-containing co-solvents triethyleneglycol dimethyl ether and triethyleneglycol to enhance the $CO_2$ absorption of the silicon-based material, 1,3-bis(3-aminopropyl)tetramethyldisiloxane, as well as to provide a liquid medium, the following Examples 13-20 were conducted. In each, the silicon-based material 1,3-bis(3-aminopropyl)tetramethyldisiloxane was exposed to 1 atmosphere of $CO_2$ in the presence of or not in the presence of a hydroxyl-containing co-solvent at 40° C. for 2 hours (h), with mechanical stirring.

Comparative Example 13

Into a pre-tared, 25 mL, three-neck, round-bottom flask equipped with a mechanical stirrer, gas inlet and a gas outlet and heated with a temperature controlled oil bath, was charged 2.0707 g of 1,3-Bis(3-aminopropyl)tetramethyldisiloxane. Dry $CO_2$ gas was introduced at a rate of ~50 mL/min into the flask via a glass tube positioned ~10 mm above the stirring liquid surface. $CO_2$ exposure continued for 2 h at 40° C. after which time the exterior of the flask was cleaned and the flask weighed. The total weight gain of 0.3588 g corresponded to 71% of the theoretical amount of weight that should have been gained if all the amine groups had reacted with a stoichiometric amount of $CO_2$. The reaction product was also a solid.

Example 14

2.0261 g of 1,3-Bis(3-aminopropyl)tetramethyldisiloxane and 2.1198 g of triethyleneglycol dimethyl ether were charged into a flask and allowed to react with $CO_2$ according to the procedure described in Example 13. The total weight gain was 0.2984 g. This corresponded to 83% of the theoretical amount of weight that should have been gained if all the amine groups had reacted with a stoichiometric amount of $CO_2$. The reaction product was a solid, which contrasts with the liquid product obtained in example 2, using triethylene glycol.

Example 15

2.0366 g of 1,3-Bis(3-aminopropyl)tetramethyldisiloxane and 4.0306 g of triethyleneglycol dimethyl ether were charged into a flask and allowed to react with $CO_2$ according to the procedure described in Example 13. The total weight gain was 0.3566 g. This corresponded to 99% of the theoretical amount of weight that should have been gained if all the amine groups had reacted with a stoichiometric amount of $CO_2$. The reaction product was a solid, which contrasts with the liquid product obtained in example 2, using triethylene glycol.

Example 16

2.0194 g of 1,3-Bis(3-aminopropyl)tetramethyldisiloxane and 2.0174 g of triethyleneglycol were charged into a flask and allowed to react with $CO_2$ according to the procedure described in Example 13. The total weight gain was 0.4089 g. This corresponded to 114% of the theoretical amount of weight that should have been gained if all the amine groups had reacted with a stoichiometric amount of $CO_2$. The reaction product was a liquid.

Example 17

2.0230 g of triethyleneglycol was charged into a flask and allowed to react with $CO_2$ according to the procedure described in Example 13. The total weight gain was 0.0004 g. This corresponded to <1% total weight gain. The reaction product in this instance was a liquid, but exhibited relatively poor $CO_2$ absorbing-capacity for triethylene glycol. This example demonstrates the necessity for having the silicon-based compound present.

Example 18

2.0387 g of 1,3-Bis(3-aminopropyl)tetramethyldisiloxane and 1.0454 g of triethyleneglycol were charged into a flask and allowed to react with $CO_2$ according to the procedure described in Example 13. The total weight gain was 0.4071 g. This corresponded to 113% of the theoretical amount of weight that should have been gained if all the amine groups had reacted with a stoichiometric amount of $CO_2$. The reaction product was a solid, in contrast to the reaction product of Example 2. This example demonstrates that, in some instances, there is an optimum ratio of silicone to solvent.

Example 19

2.0178 g of 1,3-Bis(3-aminopropyl)tetramethyldisiloxane and 4.0734 g of triethyleneglycol were charged into a flask and allowed to react with $CO_2$ according to the procedure described in Example 13. The total weight gain was 0.4203 g. This corresponded to 118% of the theoretical amount of weight that should have been gained if all the amine groups had reacted with a stoichiometric amount of $CO_2$. The reaction product was a liquid.

Example 20

2.0186 g of 1,3-Bis(3-aminopropyl)-tetramethyldisiloxane, 1.0419 g of triethyleneglycol and 0.2245 g water were charged into a flask and allowed to react with $CO_2$ according to the procedure described in Example 13. The total weight gain was 0.3545 g. This corresponded to 99% of the theoretical amount of weight that should have been gained if all the amine groups had reacted with a stoichiometric amount of $CO_2$. The reaction product was a liquid. in contrast to Example 18. The example demonstrates that, in some instances, the use of additional water can facilitate the formation of a liquid product.

The results of Examples 13-20 are summarized in Table 2, below.

TABLE 2

| Example | Co-solvent | Wt ratios (Amine:solvent:water) | $CO_2$ uptake (% theoretical) | Physical state |
|---|---|---|---|---|
| 13 (control) | None | 100:0:0 | 71 | S |
| 14 | Triethyleneglycol dimethyl ether | 50:50:0 | 83 | S |
| 15 | Triethyleneglycol dimethyl ether | 33:67:0 | 99 | S |
| 16 | Triethyleneglycol | 50:50:0 | 114 | L |
| 17 | Triethyleneglycol | 0:100:0 | — | L |
| 18 | Triethyleneglycol | 67:33:0 | 113 | ~S |
| 19 | Triethyleneglycol | 33:67:0 | 118 | L |
| 20 | Triethyleneglycol | 62:31:07 | 99 | L |

Table 2 demonstrates that, without a co-solvent, 1,3-bis(3-aminopropyl)tetramethyldisiloxane readily forms a solid material (Example 13). When triethyleneglycol dimethyl ether is added as a co-solvent (Examples 14, 15), solid reaction products are still formed. When triethyleneglycol is added at a 1:1 weight ratio (Example 16) a homogeneous reaction product is formed that, very desirably, remains liquid throughout the capture process. Varying the ratio of co-solvent to capture solvent results in varying degrees of liquidity and viscosity. (Examples 17-20)

Table 2 further demonstrates that the co-solvent alone does not physically absorb a significant amount of $CO_2$ (Example 17). However, the "mixed system" allows for enhanced capture of $CO_2$ via a synergistic action of the chemical capture process and physisorption. Water may optionally be present to aid in solubilizing the reaction products (Example 20).

Examples 21-33

Reaction of a silicon-based material with $CO_2$ in the presence of various hydroxy-containing co-solvents.

To illustrate the ability of various other hydroxy-containing co-solvents (at 50 weight % concentration) to enhance the $CO_2$ absorption of the silicon-based material, 1,3-bis(3-aminopropyl)tetramethyldisiloxane, as well as to provide a liquid medium, the following Examples 21-33 were conducted. In each example, the silicon-based material 1,3-bis(3-aminopropyl)tetramethyldisiloxane was exposed to 1 atmosphere of $CO_2$ in the presence of, or not in the presence of, a hydroxyl-containing co-solvent at 40° C. for 2 hours (h) with mechanical stirring.

Comparative Example 21

Into a pre-tared, 25 mL, three-neck, round-bottom flask equipped with a mechanical stirrer, gas inlet and a gas outlet, and heated with a temperature controlled oil bath, were charged 2.0349 g of 1,3-Bis(3-aminopropyl)tetramethyldisiloxane and 2.0472 g of SF1488 (a silicone polyether available from Momentive Performance Materials). Dry $CO_2$ gas was introduced at a rate of ~50 mL/min into the flask, via a glass tube positioned ~10 mm above the stirring liquid surface. $CO_2$ exposure continued for 2 h at 40° C., after which time the exterior of the flask was cleaned, and the flask weighed. The total weight gain of 0.2739 g corresponded to 76% of the theoretical amount of weight that should have been gained if all of the amine groups had reacted with a stoichiometric amount of $CO_2$. The reaction product was a waxy yellow solid.

Example 22

2.0311 g of 1,3-Bis(3-aminopropyl) tetramethyl-disiloxane and 2.0506 g of a diol terminated disiloxane prepared via the hydrosilylation of trimethylolpropane mono allyl ether with tetramethyl disiloxane were charged into a flask and allowed to react with $CO_2$, according to the procedure described in Example 21. The total weight gain was 0.3491 g. This corresponded to 97% of the theoretical amount of weight that should have been gained if all the amine groups had reacted with a stoichiometric amount of $CO_2$. The reaction product was a viscous liquid.

Example 23

2.0337 g of 1,3-Bis(3-aminopropyl) tetramethyl-disiloxane and 2.0653 g of tetrathylene glycol were charged into a flask and allowed to react with $CO_2$ according to the procedure described in Example 21. The total weight gain was 0.4182 g. This corresponded to 116% of the theoretical amount of weight that should have been gained if all the amine groups had reacted with a stoichiometric amount of $CO_2$. The reaction product was a moderately viscous liquid.

Example 24

2.0745 g of 1,3-Bis(3-aminopropyl) tetramethyl-disiloxane and 2.0507 g of poly(propylene glycol) with a molecular weight of 725 were charged into a flask and allowed to react with $CO_2$ according to the procedure described in Example 21. The total weight gain was 0.3400 g. This corresponded to 92.5% of the theoretical amount of weight that should have been gained if all the amine groups had reacted with a stoichiometric amount of $CO_2$. The reaction product was a solid that formed very quickly on introduction of the gas.

Example 25

1.9957 g of 1,3-Bis(3-aminopropyl) tetramethyl-disiloxane and 2.0630 g of a 3:1 blend of tetraethylene glycol and the diol terminated disiloxane from example B above, were charged into a flask and allowed to react with $CO_2$ according to the procedure described in Example 21. The total weight gain was 0.3937 g. This corresponded to 111% of the theoretical amount of weight that should have been gained if all the amine groups had reacted with a stoichiometric amount of $CO_2$. The reaction product was a moderately viscous liquid.

Example 26

2.0385 g of 1,3-Bis(3-aminopropyl) tetramethyl-disiloxane and 1.9718 g of trimethyolpropane mono allyl ether were charged into a flask and allowed to react with $CO_2$ according to the procedure described in Example 21. The total weight gain was 0.3876 g. This corresponded to 107% of the theoretical amount of weight that should have been gained if all the amine groups had reacted with a stoichiometric amount of $CO_2$. The reaction product was a moderately viscous liquid.

Example 27

2.0683 g of 1,3-Bis(3-aminopropyl) tetramethyl-disiloxane and 2.0709 g of eugenol were charged into a flask and allowed to react with $CO_2$ according to the procedure described in Example 21. The total weight gain was 0.3449 g. This corresponded to 94% of the theoretical amount of weight that should have been gained if all the amine groups had reacted with a stoichiometric amount of $CO_2$. The reaction product was a viscous yellow liquid.

Example 28

2.0291 g of 1,3-Bis(3-aminopropyl) tetramethyl-disiloxane and 1.9965 g of trimethylolpropane ethoxylate (4/15 EO/OH, Mn~170) were charged into a flask and allowed to react with $CO_2$ according to the procedure described in Example 21. The total weight gain was 0.3640 g. This corresponded to 101% of the theoretical amount of weight that should have been gained if all the amine groups had reacted with a stoichiometric amount of $CO_2$. The reaction product was a very viscous yellow liquid.

Example 29

2.0157 g of 1,3-Bis(3-aminopropyl) tetramethyl-disiloxane and 2.0675 g of pentaerythritol ethoxylate (3/4 EO/OH, Mn~270) were charged into a flask and allowed to react with $CO_2$ according to the procedure described in Example 21. The total weight gain was 0.3855 g. This corresponded to 108% of the theoretical amount of weight that should have been gained if all the amine groups had reacted with a stoichiometric amount of $CO_2$. The reaction product was a very viscous liquid.

Example 30

1.9999 g of 1,3-Bis(3-aminopropyl) tetramethyl-disiloxane and 2.0129 g of a 2:1 blend of tetraethylene glycol and eugenol were charged into a flask and allowed to react with $CO_2$ according to the procedure described in Example 21. The total weight gain was 0.3773 g. This corresponded to 107% of the theoretical amount of weight that should have been gained if all the amine groups had reacted with a stoichiometric amount of $CO_2$. The reaction product was a viscous yellow liquid.

Example 31

2.0391 g of 1,3-Bis(3-aminopropyl) tetramethyl-disiloxane and 2.0640 g of isoeugenol were charged into a flask and allowed to react with $CO_2$ according to the procedure described in Example 21. The total weight gain was 0.3464 g. This corresponded to 96% of the theoretical amount of weight that should have been gained if all the amine groups had reacted with a stoichiometric amount of $CO_2$. The reaction product was a viscous yellow liquid.

Example 32

2.0379 g of 1,3-Bis(3-aminopropyl) tetramethyl-disiloxane and 2.0447 g of sulfolane were charged into a flask and allowed to react with $CO_2$ according to the procedure described in Example 21. The total weight gain was 0.3227 g. This corresponded to 89% of the theoretical amount of weight that should have been gained if all the amine groups had reacted with a stoichiometric amount of $CO_2$. The reaction product was a solid that formed very quickly on introduction of the gas.

Example 33

2.0118 g of 1,3-Bis(3-aminopropyl) tetramethyl-disiloxane and 2.0010 g of 2-allyl-6-methylphenol were charged into a flask and allowed to react with $CO_2$ according to the procedure described in Example 21. The total weight gain was 0.2711 g. This corresponded to 76% of the theoretical amount of weight that should have been gained if all the amine groups had reacted with a stoichiometric amount of $CO_2$. The reaction product was a light yellow liquid.

Example 33A 1.0258 g of 1,3-Bis(3-aminopropyl)-tetramethyldisiloxane and 1.0266 g glycerol were charged to a flask and allowed to react with $CO_2$, according to the procedure described above for Example 1. The total weight gain was 0.1888 g. This corresponds to 104% of the theoretical amount of weight that should have been gained if all the amine groups reacted with a stoichiometric amount of $CO_2$. The final mixture was a liquid.

The results of Examples 21-33 and 33A are summarized in Table 3, below.

TABLE 3

| Example | Co-Solvent (50 wt %) | % of Theoretical wt gain | Physical state of product |
|---|---|---|---|
| 21 Comparative | SF1488 Momentive Silicone polyether | 76 | S |
| 22 | a hydrosilylation reaction product of 1,1,3,3-tetramethyldisiloxane and trimethylolpropane allyl ether | 97 | L |
| 23 | Tetraethylene glycol | 116 | L |
| 24 | Poly(propylene glycol) MW = 725 | 93 | S |
| 25 | Mixture of tetraethylene glycol/ 1,3-bis(3-hydroxypropyl)tetramethyldisiloxane 3:1 | 111 | L |
| 26 | Trimethylolpropane allyl ether | 107 | L |
| 27 | Eugenol | 94 | L |
| 28 | Trimethylolpropane ethoxylate Mn = 170 | 101 | L |
| 29 | Pentaerythritol ethoxylate Mn = 270 | 108 | L |
| 30 | 2:1 Tetraethylene glycol/eugenol | 107 | L |
| 31 | Isoeugenol | 96 | L |
| 32 comparative | Sulfolane | 89 | S |
| 33 | 2-allyl-6-methylphenol | 76 | L |
| 33A | Glycerol | 104 | L |

Examples 34-50

High Throughput Screening Experiments

The high throughput screening experiments were carried out using a 27 well parallel reactor (React Vap III) from Pierce and a Symyx Core Module for automated weighing in 8 mL glass vials. The experiments were run using technical grade $CO_2$ at 1 atm and the flow was set at 1.2 mL/h (10000 $cm^2$/min) by using a MKS gas flow controller. Each formulation was tested in triplicate. The co-solvents were purchased from Aldrich or Fisher Scientific and used without further purification.

Each vial was loaded with a stirrer bar and pre-weighed using the Symyx Core module. The vials were then loaded with the corresponding compound (200-300 μL) and the appropriate co solvent (200-300 μL). The resulting mixture was stirred for 15-20 min and treated with $CO_2$ gas (1 atm) for 60-120 min at the desired temperature (40 and 55° C.). After the $CO_2$ treatment, the reactor block was cooled down to room temperature and all the vials were transferred to a Symyx Core Module® for automated weighing. The physical state of each vial was visually inspected and recorded. The $CO_2$ adsorption performance was reported as an average of the % weight gain after each $CO_2$ treatment. The results of these experiments are shown in Table 4.

Generally speaking, Table 4 shows that capped-hydroxy compounds yielded solid reaction products, while uncapped co-solvents yielded soluble solutions. The amide-based compound, N-methylpyrrolidone (NMP), did not perform successfully as a solvent.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A carbon dioxide absorbent, comprising: (i) a liquid, nonaqueous silicon-based material, functionalized with one or more nitrogen atom-containing groups that reversibly react with $CO_2$ and/or have a high-affinity for $CO_2$; and (ii) a hydroxy-containing solvent that is capable of dissolving

TABLE 4

| Ex. | Silicon-based Material | Co-Solvent | Wt ratios* | %** | % wt gain | Physical state*** |
|---|---|---|---|---|---|---|
| 34 | 1,3-Bis(3-aminopropyl) tetramethyldisiloxane | triethylene glycol | 10:90 | 175 | 3.1 | L |
| 35 | 1,3-Bis(3-aminopropyl) tetramethyldisiloxane | triethylene glycol | 30:70 | 155 | 8.2 | L |
| 36 | 1,3-Bis(3-aminopropyl) tetramethyldisiloxane | triethylene glycol | 50:50 | 133 | 11.8 | L |
| 37 | 1,3-Bis(3-aminopropyl) tetramethyldisiloxane | N methyl pyrrolidone (NMP) | 50:50 | 118 | 10.4 | L |
| 38 Comp | 1,3-Bis(3-aminopropyl) tetramethyldisiloxane | Tetraglyme dimethyl ether | 50:50 | 123 | 10.9 | S |
| 39 | Aminoethylaminopropyl methylsiloxane oligomers | triethylene glycol | 10:90 | 165 | 4.6 | L |
| 40 | Aminoethylaminopropyl methylsiloxane oligomers | triethylene glycol | 30:70 | 122 | 10.2 | L |
| 41 | Aminoethylaminopropyl methylsiloxane oligomers | triethylene glycol | 50:50 | 44 | 6.2 | L |
| 42 Comp | Aminoethylaminopropyl methylsiloxane oligomers | N methyl pyrrolidone | 50:50 | 56 | 7.8 | S |
| 43 Comp | Aminoethylaminopropyl methylsiloxane oligomers | Tetraglyme dimethyl ether | 50:50 | 41 | 5.7 | S |
| 44 Comp | 1,3,5,7-tetrakis(3-aminopropyl) tetramethylcyclotetrasiloxane | N methyl pyrrolidone | 50:50 | 84 | 7.9 | S |
| 45 Comp | 1,3,5,7-tetrakis(3-aminopropyl) tetramethylcyclotetrasiloxane | Tetraglyme dimethyl ether | 50:50 | 53 | 5.0 | S |
| 46 | 1,3-Bis(aminoethylaminomethyl) tetramethyldisiloxane | triethylene glycol | 10:90 | 158 | 5.0 | L |
| 47 | 1,3-Bis(aminoethylaminomethyl) tetramethyldisiloxane | triethylene glycol | 30:70 | 117 | 11.1 | L |
| 48 | 1,3-Bis(aminoethylaminomethyl) tetramethyldisiloxane | triethylene glycol | 50:50 | 74 | 11.7 | L |
| 49 Comp | 1,3-Bis(aminoethylaminomethyl) tetramethyldisiloxane | N methyl pyrrolidone | 50:50 | 59 | 9.3 | S |
| 50 Comp | 1,3-Bis(aminoethylaminomethyl) tetramethyldisiloxane | Tetraglyme dimethyl ether | 50:50 | 64 | 10.1 | S |

*Amine:solvent
**of theoretical
***After absorption both the silicon-based material and a reaction product of the silicon-based material and $CO_2$.

2. The absorbent of claim 1, wherein the functionalized silicon-based material comprises silanes, or compounds containing one or more siloxy units, or combinations of thereof.

3. The absorbent of claim 1, wherein the functional group(s) comprise(s) one or more aliphatic amines, imines, amidines, amides, heterocyclic amino compounds, aromatic amines, and combinations thereof.

4. The absorbent of claim 3, wherein the functional group(s) comprise(s) one or more amines.

5. The absorbent of claim 4, wherein the functional group(s) comprise(s) one or more di-, tri- and polyamines or combinations of these.

6. The absorbent of claim 5, wherein the functional group(s) comprise(s) one or more aminomethyl, aminoethyl, aminopropyl, aminoethylaminopropyl, piperazinopropyl, aminomethylaminoethyl, 2 aminopropylpyridyl, groups or combinations of these.

7. The absorbent of claim 1, wherein the functional group(s) comprise(s) one or more amino hydroxy groups.

8. The absorbent of claim 1, wherein the solvent has a vapor pressure below about 150 mm Hg at 100° C.

9. The absorbent of claim 1, wherein the solvent comprises two or more hydroxyl groups.

10. The absorbent of claim 9, wherein the solvent comprises a glycol, a hydroxylated silicone, a phenol, or combinations of the foregoing.

11. The absorbent of claim 10, wherein the solvent comprises trimethylolpropane ethoxylates, glycerol, triethylene glycol, tetraethylene glycol, 1,3-bis(3-hydroxypropyl) tetramethyldisiloxane, a hydrosilylation reaction product of 1,1,3,3-tetramethyldisiloxane and trimethylolpropane allyl ether, eugenol, isoeugenol, 2-allyl-6-methylphenol, 2-allylphenol or combinations of the foregoing.

12. The absorbent of claim 1, further comprising antioxidants, stabilizers, accelerators, antifoaming agents or blends thereof.

13. The carbon dioxide absorbent of claim 1, wherein the nitrogen atom-containing functional group is not a sterically hindered amine.

14. The carbon dioxide absorbent of claim 1, wherein the functionalized, silicon-based material comprises less than 20 repeating, monomeric units.

15. The carbon dioxide absorbent of claim 14, wherein the functionalized, silicon-based material comprises 10 or less repeating, monomeric units.

* * * * *